(No Model.)
W. M. VICTOR.
LOGGING MOTOR.
No. 335,258. Patented Feb. 2, 1886.
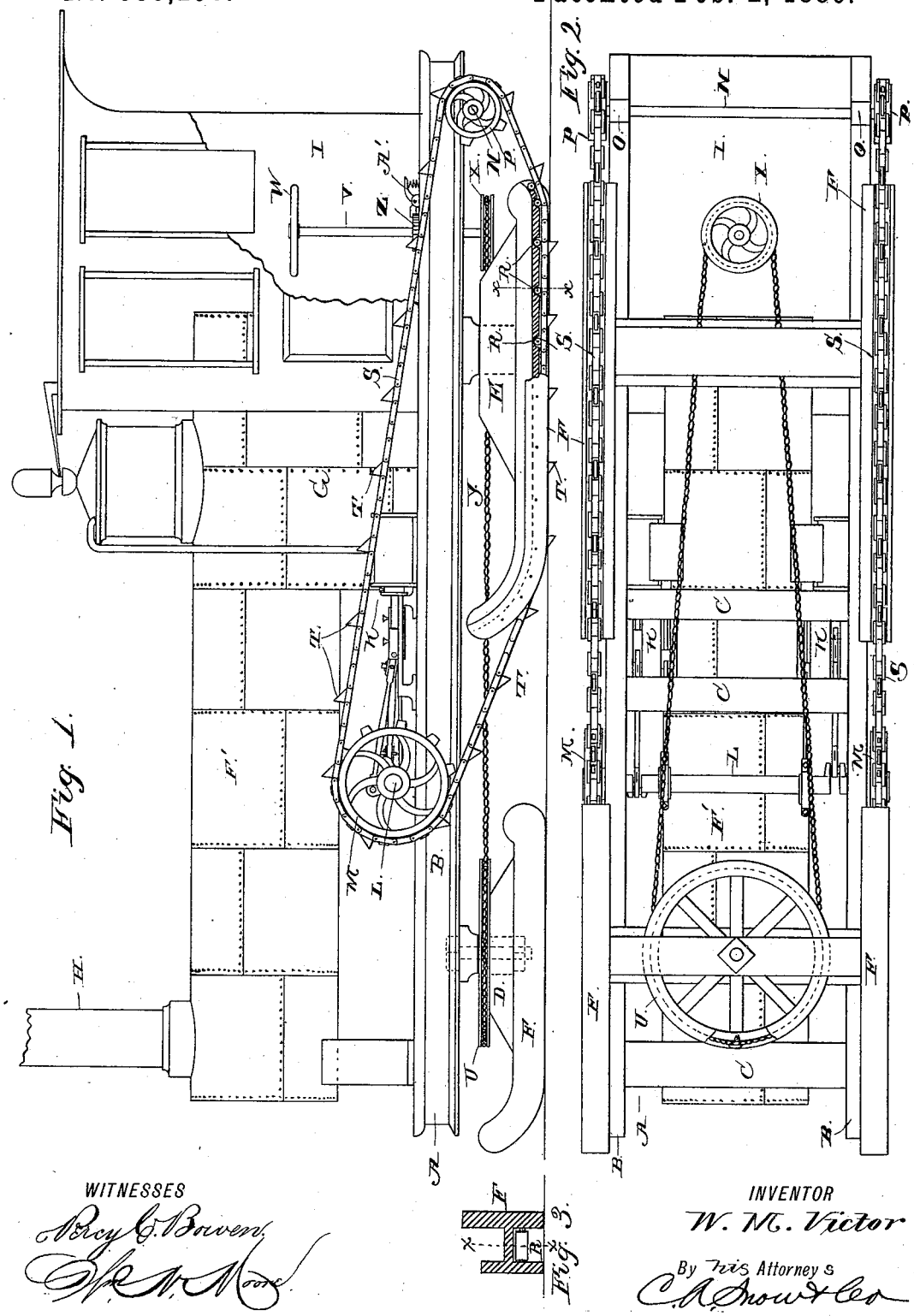
WITNESSES
INVENTOR
W. M. Victor
By his Attorneys

UNITED STATES PATENT OFFICE.

WALTER MOSES VICTOR, OF MARINETTE, WISCONSIN.

LOGGING-MOTOR.

SPECIFICATION forming part of Letters Patent No. 335,258, dated February 2, 1886.

Application filed June 27, 1885. Serial No. 170,025. (No model.)

*To all whom it may concern:*

Be it known that I, WALTER M. VICTOR, a citizen of the United States, residing at Marinette, in the county of Marinette and State of Wisconsin, have invented a new and useful Improvement in Logging-Motors, of which the following is a specification, reference being had to the accompanying drawings.

My invention relates to an improvement in logging motors; and it consists in the peculiar construction and combination of devices, that will be more fully set forth hereinafter, and particularly pointed out in the claims.

In the accompanying drawings, Figure 1 is a side elevation of a motor embodying my invention. Fig. 2 is a bottom plan view of the same. Fig. 3 is a detailed view.

A represents the frame of my motor, which consists, essentially, of the longitudinal side beams or girders, B, and the transverse tie-beams C. This frame is supported upon trucks D and E, which trucks are provided with runners F. The front truck, D, is pivoted below the frame; but the rear truck, E, is rigidly secured thereto.

F' represents a boiler, preferably of the same type as a locomotive-boiler, and is secured to the frame, and is provided with a furnace, G, and a smoke-stack, H, and on the rear end of the frame is a cab, I. A pair of reversible reciprocating engines, K, are secured on the frame, one on each side thereof, and the pitmen of these engines are connected to a crank-shaft, L, that is journaled transversely in blocks bolted to the beams B, and extends under the boiler. On the projecting ends of the shaft are secured sprocket-wheels, M.

N represents a transverse shaft that is journaled in blocks O, secured to the under sides of the beams B, at the rear ends thereof, and on the ends of this shaft are secured sprocket-wheels P. The runners of the rear truck are grooved on their under sides, as shown, and provided with transverse anti-friction rollers R. Endless sprocket-chains S connect the wheels M and P, and pass under the grooved runners, and bear under the anti-friction rollers therein. To these chains S are secured projecting pointed teeth T.

To the pivotal shaft of the front truck, D, is secured a wheel, U. A vertical shaft, V, is journaled in the rear end of the frame, and is provided at its upper end with a steering-wheel, W, and at its lower end with a chain-wheel, X. An endless steering-chain, Y, connects the wheels U and X. The shaft V is also provided with a notched wheel, Z, with which engages a spring-pawl, A', that is adapted to be removed out of engagement with the wheel by the foot of the engineer or the person steering the motor.

This invention is particularly adapted for use in drawing sleds loaded with logs through the woods to the river down which the logs are to be floated; but it is adapted for other uses as well.

The operation of my invention is as follows: When the engines are driven ahead, the chains S are moved rearwardly under the rear runners, and the teeth with which said chains are provided engage with the snow or ice and impel the motor forward, as will be very readily understood. A reverse movement of the engines reverses the motor.

By providing the rear runners with the grooves to receive the chains, the latter are prevented from slipping laterally from the runners, and by means of the anti-friction rollers, previously fully described, the chains are permitted to work freely under the grooved sides of the runners.

I do not desire to limit myself to the precise construction and arrangement of devices hereinbefore set forth, as it is evident that many modifications may be made therein without departing from the spirit of my invention.

Having thus described my invention, I claim—

1. The combination, with the grooved runners, of the endless traction-chains passing under said runners and means for driving the chains, substantially as described.

2. The combination, with the sled or truck having the runners, of the endless traction-chains having the projecting teeth engaging with the snow or ice and means for moving the traction-chains, substantially as described.

3. The combination, with the grooved runners having the anti-friction rollers, of the endless traction-chains passing under said runners and bearing on the rollers and means for driving the chains, substantially as described.

4. The combination of the frame, the engines, the trucks, and the steering devices for one of the trucks with the shaft L, connected to the engines and having the sprocket-wheels M, the shaft N, having the sprocket-wheels P, and the endless traction-chains having the projecting teeth, said chains connecting the sprocket-wheels M and P and passing under the grooved runners of one of the trucks, substantially as described.

In testimony that I claim the foregoing as my own I have hereto affixed my signature in presence of two witnesses.

WALTER MOSES VICTOR.

Witnesses:
E. C. LANE,
JAMES H. MACNAUGHTON.